US009367414B2

(12) United States Patent
Sevigny et al.

(10) Patent No.: US 9,367,414 B2
(45) Date of Patent: Jun. 14, 2016

(54) PERSISTING HIGH AVAILABILITY PROTECTION STATE FOR VIRTUAL MACHINES STORED ON DISTRIBUTED OBJECT-BASED STORAGE

(71) Applicant: VMware, Inc., Palo Alto, CA (US)

(72) Inventors: Marc Sevigny, Harvard, MA (US); Keith Farkas, San Carlos, CA (US); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 91 days.

(21) Appl. No.: 14/317,637

(22) Filed: Jun. 27, 2014

(65) Prior Publication Data
US 2015/0378857 A1 Dec. 31, 2015

(51) Int. Cl.
G06F 11/00 (2006.01)
G06F 11/20 (2006.01)
G06F 9/455 (2006.01)

(52) U.S. Cl.
CPC ........ *G06F 11/2094* (2013.01); *G06F 9/45558* (2013.01); *G06F 11/203* (2013.01); *G06F 2009/45575* (2013.01); *G06F 2009/45587* (2013.01); *G06F 2201/815* (2013.01)

(58) Field of Classification Search
CPC .............. G06F 9/45558; G06F 11/203; G06F 11/2094; G06F 2201/815; G06F 2009/45575; G06F 2009/45587
See application file for complete search history.

(56) References Cited

U.S. PATENT DOCUMENTS

| 7,484,208 | B1 | 1/2009 | Nelson | |
|---|---|---|---|---|
| 7,779,295 | B1 | 8/2010 | Shah et al. | |
| 8,370,679 | B1* | 2/2013 | Gawali | G06F 11/2023 714/25 |
| 8,910,160 | B1* | 12/2014 | Patwardhan | G06F 9/4856 718/1 |
| 9,223,606 | B1* | 12/2015 | Vaidya | G06F 9/45558 |
| 2006/0021033 | A1* | 1/2006 | Huynh | G06F 21/85 726/22 |
| 2007/0103984 | A1* | 5/2007 | Kavuri | G06F 3/0605 365/185.17 |
| 2007/0204265 | A1 | 8/2007 | Oshins | |
| 2008/0104608 | A1 | 5/2008 | Hyser | |
| 2008/0189468 | A1* | 8/2008 | Schmidt | G06F 11/203 711/6 |
| 2009/0260008 | A1 | 10/2009 | Cho et al. | |
| 2011/0125991 | A1 | 5/2011 | Annan et al. | |
| 2011/0225095 | A1* | 9/2011 | Gawali | G06F 11/2023 705/300 |
| 2011/0231696 | A1* | 9/2011 | Ji | G06F 11/1438 714/3 |
| 2012/0198448 | A1 | 8/2012 | Cervantes | |
| 2012/0278801 | A1 | 11/2012 | Nelson et al. | |

(Continued)

OTHER PUBLICATIONS

U.S. Appl. No. 14/010,293, filed Aug. 26, 2013 entitled "Scalable Distributed Storage Architecture".

(Continued)

*Primary Examiner* — Joshua P Lottich

(57) ABSTRACT

Techniques are disclosed for persisting high availability (HA) protection state for virtual machines (VMs) running on host systems of a host cluster, where the host cluster aggregates locally-attached storage resources of the host systems to provide an object store, and where persistent data for the VMs is stored as per-VM storage objects across the locally-attached storage resources comprising the object store. In one embodiment, a host system in the host cluster executing a HA module determines an identity of a VM that has been powered-on in the host cluster. The host system then persists HA protection state for the VM in a storage object of the VM, where the HA protection state indicates that the VM should be restarted on an active host system in the case of a failure in the host cluster.

21 Claims, 14 Drawing Sheets

(56) References Cited

U.S. PATENT DOCUMENTS

| | | | |
|---|---|---|---|
| 2012/0311576 A1* | 12/2012 | Shu | G06F 9/45558 718/1 |
| 2013/0297964 A1* | 11/2013 | Hegdal | G06F 11/0712 714/2 |
| 2014/0129521 A1 | 5/2014 | Marsden | |
| 2014/0143504 A1* | 5/2014 | Beveridge | G06F 12/0815 711/143 |
| 2014/0229440 A1* | 8/2014 | Venkatesh | G06F 17/30174 707/634 |
| 2014/0317438 A1* | 10/2014 | Ripoll | G06F 11/2002 714/4.11 |
| 2015/0052382 A1 | 2/2015 | Sarisky et al. | |
| 2015/0095788 A1* | 4/2015 | Thiele | G06F 3/04817 715/735 |
| 2015/0180714 A1* | 6/2015 | Chunn | H04L 41/0813 709/221 |
| 2015/0248402 A1* | 9/2015 | Patterson, III | G06F 17/302 707/640 |

OTHER PUBLICATIONS

U.S. Appl. No. 14/317,669, filed Jun. 27, 2014 entitled "Orchestrating High Availability Failover for Virtual Machines Stored on Distributed Object-Based Storage".

U.S. Appl. No. 14/317,712, filed Jun. 27, 2014 entitled "Maintaining High Availability During Network Partitions for Virtual Machines Stored on Distributed Object-Based Storage".

Office Action Dated Mar. 2, 2016; U.S. Appl. No. 14/317,669; (18 pgs.).

Office Action Dated Apr. 11, 2016; U.S. Appl. No. 14/371,712; (30 pgs).

* cited by examiner

PERSISTING HIGH AVAILABILITY PROTECTION STATE FOR VIRTUAL MACHINES STORED ON DISTRIBUTED OBJECT-BASED STORAGE

BACKGROUND

Virtual machine high availability (referred to herein simply as "high availability," or HA) and hypervisor-converged object-based (HC/OB) storage are two emerging technologies in the field of computer virtualization. HA is designed to minimize virtual machine (VM) downtime by monitoring the availability of host systems and VMs in a host cluster. If an outage, such as a host or network failure, causes one or more VMs to stop executing, HA detects the outage and automatically restarts the affected VMs on active host systems in the cluster. In this way, HA ensures that guest applications running within the VMs continue to remain operational throughout the outage. One exemplary HA implementation is described in commonly-assigned U.S. Patent Application Publication No. 2012/0278801, published Nov. 1, 2012, entitled "Maintaining High Availability of a Group of Virtual Machines Using Heartbeat Messages."

HC/OB storage is a distributed, software-based storage technology that leverages the local or direct attached storage resources (e.g., solid state disks, spinning hard disks, etc.) of host systems in a host cluster by aggregating these locally-attached resources into a single, logical storage pool. Thus, this technology effectively re-purposes the host cluster to also act as a distributed storage cluster. A hypervisor-based storage system layer (referred to herein generically as a "VSAN layer" comprising "VSAN modules") manages the logical storage pool and enables interactions between the logical storage pool and storage clients, such as VMs running on host systems in the cluster. For example, the VSAN layer allows the VMs to access the logical storage pool during VM runtime in order to store and retrieve persistent VM data (e.g., virtual disk data).

The qualifier "object-based" in "hypervisor-converged object-based storage" refers to the manner in which VMs are maintained within HC/OB storage—in particular, the state of each VM is organized as a hierarchical collection of distinct storage objects (or simply "objects"). For example, the files that hold the metadata/configuration of a VM may reside in a file system that is created within a namespace object (also known as a "file system object"), the virtual disks of the VM may reside in virtual disk objects, and so on. Each of these storage objects may be composed of multiple component objects. The VSAN layer provisions, manages, and monitors each of these storage objects individually. For instance, in order to meet a particular storage policy for a particular virtual disk VMDK1, the VSAN layer may determine that the component storage objects that make up the virtual disk object corresponding to VMDK1 should be striped across the locally-attached storage of three different host systems. Through these and other mechanisms, HC/OB storage can provide improved ease of management, scalability, and resource utilization over traditional storage solutions. One exemplary implementation of an HC/OB storage system is described in commonly-assigned U.S. patent application Ser. No. 14/010,293, filed Aug. 26, 2013, entitled "Scalable Distributed Storage Architecture."

Unlike non-object-based storage systems, the state of a VM is not contained within a larger, coarse storage container (e.g., a LUN). Having such storage containers provide a couple of benefits. First, a coarse storage container provides a convenient location to store information common to all VMs that use the container. For example, it is possible to create a file system on top of a LUN, create a directory within the file system for each VM whose state is stored on the underlying storage device(s), and then create a directory at the root to store shared information. Second, for a given class of failures, one can reason about the availability/accessibility of all of the VM data stored within a storage container by reasoning about the availability/accessibility of the container itself. For instance, one can determine whether a network failure impacts the accessibility of the VM data by determining if the container is accessible. As a result, there is no need to track the accessibility of each individual VM stored in a single storage container—instead, it is sufficient to track the accessibility of the container itself.

The lack of coarse storage containers raises unique challenges when attempting to use HC/OB storage and HA concurrently in the same virtualized compute environment. As one example, existing HA implementations typically maintain information known as "HA protection state" that identifies the VMs in a host cluster that should be failed-over/restarted in the event of a failure. The "master" HA module in the cluster (i.e., the HA module that is responsible for detecting failures and orchestrating VM failovers/restarts) manages this HA protection state by persisting it to a centralized file (or set of files) on the storage tier. If there is an outage that affects a subset of host systems in the cluster, one or more new master HA modules may be elected. Each newly elected master HA module may then retrieve the file from the storage tier to determine which VMs are HA protected. This approach works well if the storage tier is implemented using dedicated shared storage, since the HA protection file can be placed in the storage container storing the configurations for the protected VMs. On the other hand, if the storage tier is implemented using HC/OB storage, there is no convenient location to store such information that is shared across VMs.

As another example, in existing HA implementations, when a master HA module detects a failure that requires one or more VMs to be failed-over/restarted, the master HA module executes a conventional failover workflow that involves (1) identifying active host systems for placing the VMs that can meet the VMs' resource needs, and (2) initiating VM restarts on the identified host systems. If the VMs are stored on dedicated shared storage, these two steps are generally sufficient for successfully completing the failover. However, if the VMs are stored on HC/OB storage, there may be cases where a VM cannot be restarted because one or more of its storage objects are not yet accessible to the host system executing on the master HA module (and/or to the host system on which the restart is being attempted). This situation cannot be uncovered using conventional coarse-grained storage accessibility checks. This, in turn, can cause the conventional failover workflow to break down, or result in multiple continuous restart attempts, which can increase the load on the affected host systems.

As yet another example, there are certain types of network partitions that can further complicate the HA protection state persistence and VM failover/restart workflows noted above. As one example, if there is a failure that causes the VSAN modules to observe a partition while the HA modules do not, there may be instances where the host system on which the master HA module is running does not have access/visibility to a particular VM (and thus cannot update/retrieve HA protection state information for the VM, or determine its accessibility for failover purposes), while the host systems of other, slave HA modules do have such access/visibility.

Accordingly, it would be desirable to have techniques for integrating HA with distributed object-based storage systems like HC/OB storage that overcome these, and other similar, issues.

DETAILED DESCRIPTION

Figure 1:
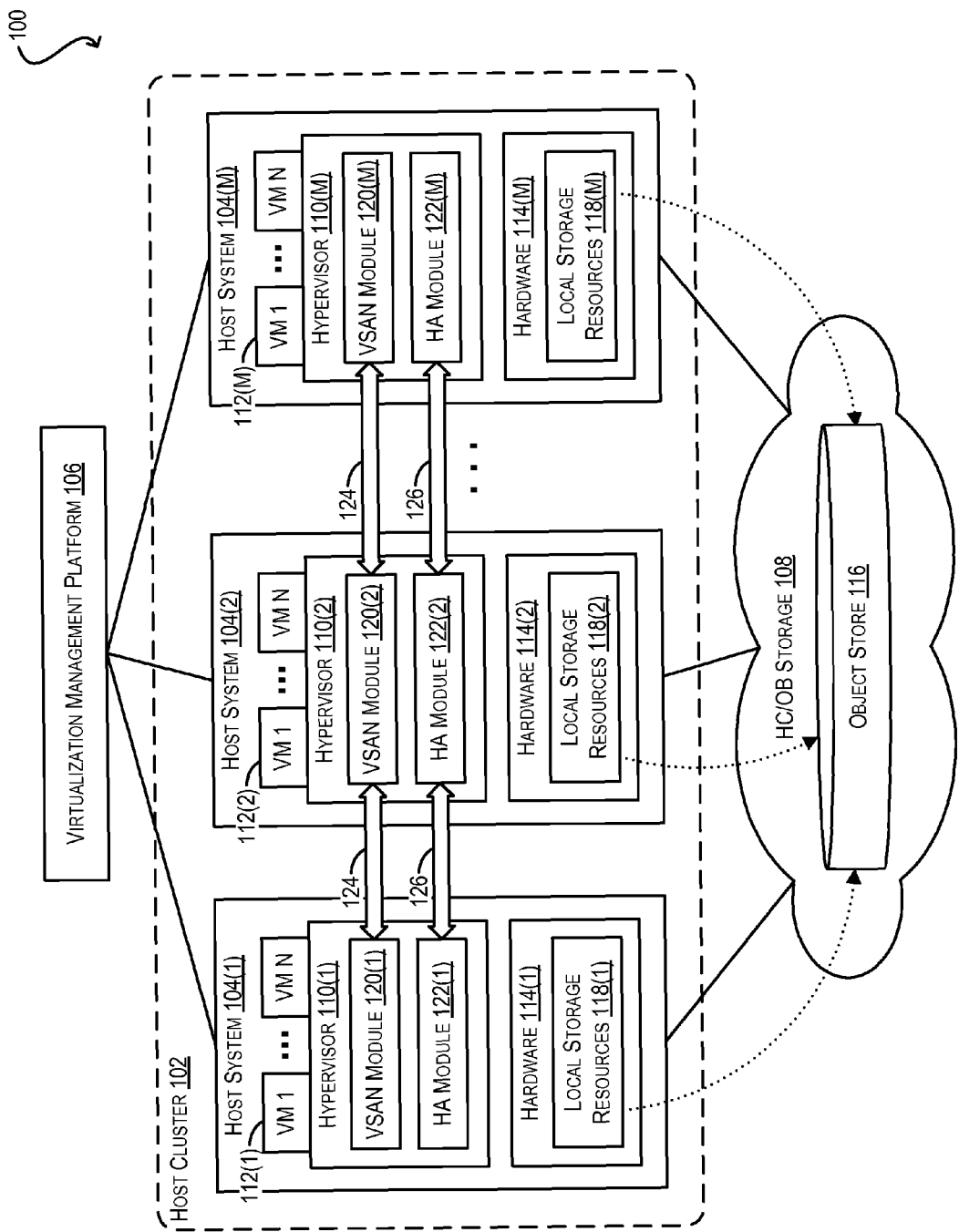
FIG. 1 depicts a virtualized compute environment that implements both HC/OB storage and HA according to an embodiment.

The present disclosure describes techniques that allow high availability (HA) to be provided for VMs that are stored on distributed object-based storage. In one set of embodiments, the techniques can include persisting, by a master HA module, HA protection state for VMs in a host cluster on a per-VM basis (rather than in a centralized file) in the logical storage pool of the distributed object-based storage system. For example, in a particular embodiment, the master HA module can persist HA protection state for a given VM as metadata for the VM's namespace object. With this approach, the master HA module can avoid scenarios where it can access the VM itself, but cannot access the VM's protection state (or vice versa). This approach also provides performance benefits when a newly elected master HA module needs to retrieve the persisted protection state information.

In another set of embodiments, the techniques can include modifying the conventional failover/restart workflow performed by the master HA module to account for potential VM inaccessibility at the time of failover. With these modifications, the master HA module can more gracefully deal with situations where a VM has been identified as a failover candidate, but some critical subset of the VM's storage objects remains unavailable.

In yet another set of embodiments, the techniques can include enhancements to both the HA protection state persistence and restart/failover workflows mentioned above so that they can operate more effectively in specific network partition scenarios.

In the sections that follow, numerous examples and details are set forth in order to provide a thorough understanding of various embodiments. It should be appreciated, however, that certain embodiments can be practiced without some of these details, or can be practiced with modifications or equivalents thereof. For instance, although examples are provided for integrating HA with HC/OB storage in particular, the techniques of the present disclosure may also be used to integrate HA functionality with other types of storage systems that exhibit characteristics similar to HC/OB systems (e.g., distributed object-based storage systems that expose multiple, distinct ingress/access points to storage clients). Further, although certain embodiments are discussed in the context of a HA system that relies on a master/slave model comprising at least one master HA module and multiple slave HA modules, the present techniques are applicable to any distributed, high availability system designed to monitor the liveliness of VMs and failover such VMs in the case of failures, regardless of the manner in which the HA modules interoperate (e.g., master/slave, peer-to-peer, etc.). For example, in a peer-to-peer HA implementation, the functions attributed to the master HA module in the sections below may be performed by one or more peer HA modules. One of ordinary skill in the art will recognize many variations, modifications, and alternatives.

For purposes of this disclosure, a VM is said to be "stored on" distributed object-based (e.g., HC/OB) storage if the VM's configuration (e.g., vmx file) is maintained within the storage system's logical storage pool (sometimes referred to herein as the "object store"). Other state information for the VM (e.g., virtual disk data) may also be maintained within the HC/OB storage pool, or may be stored on traditional shared storage.

Further, a VM is said to be "accessible" by/to a host system (or a module thereof, such as a HA module running on the host system) if all of its storage objects can be accessed by the host system. The VM is "inaccessible" if these requirements are not met. Alternatively, in some embodiments, a VM may be considered "accessible" if some user-defined subset of "required" storage objects can be accessed by the host system. One exemplary object structure for a VM (which can include, e.g., a namespace object, one or more virtual disk objects, and so on) is described in Section 1.1 below.

1. Virtualized Compute Environment

To provide context for the techniques described herein, FIG. 1 depicts a virtualized compute environment 100 that implements both HC/OB storage and HA according to an embodiment. As shown, environment 100 includes a host cluster 102 comprising host systems 104(1)-104(M), a virtualization management platform 106, and a conceptual HC/OB storage component 108.

Host cluster 102 and constituent host systems 104(1)-104(M) provide virtualized compute resources within environment 100. For example, each host system 104(1)-104(M) includes a virtualization layer, or "hypervisor," 110(1)-110(M) through which the host system can execute one or more VMs 112(1)-112(M). As part of its responsibilities, each hypervisor can manage the physical hardware 114(1)-114(M) of its respective host system (e.g., CPU, memory, etc.) to make these hardware resources available, in appropriate amounts, to running VMs.

Virtualization management platform 106 is an entity that allows users to perform administrative and management tasks with respect to host cluster 102, such as configuring and managing the lifecycles of VMs 112(1)-112(M) running on host systems 104(1)-104(M). Virtualization management platform 106 can also interact with host systems 104(1)-104(M) to enable/facilitate certain inter-host features, such as VM migrations, distributed resource scheduling, and so on.

HC/OB storage 108 is a conceptual representation of a distributed, software-based storage tier that provides storage services to host cluster 102. For instance, HC/OB storage 108 can be used to store the persistent state of VMs 112(1)-112(M) running on host systems 104(1)-104(M). As shown in FIG. 1, HC/OB storage 108 comprises a logical storage pool (i.e., object store 116) that is an aggregation of local storage resources 118(1)-118(M) that are locally-attached (i.e., housed in or attached via a point-to-point link) to host systems 104(1)-104(M). These local storage resources may include, e.g., commodity SSDs, commodity spinning hard disks, and other types of non-volatile memory. Since object store 116 of HC/OB storage 108 is composed entirely of aggregated host-side storage, there is no physical distinction between the storage tier of environment 100 represented by HC/OB storage 108 and the compute tier of environment 100 represented by host cluster 102. They are, from a physical perspective, one and the same.

Per its designation as an "object-based" storage component, HC/OB storage 108 stores data, such as VM state, in the form of distinct storage objects. As noted in the Background section, these storage objects can be provisioned, managed, and monitored on an individual basis. Thus, unlike non-object-based storage systems that typically group together the states for multiple VMs into a coarse storage container (e.g., a LUN or file system container), HC/OB storage 108 can provide granular performance isolation, per-VM or per-virtual disk quality of service, and other features that are beneficial in virtualized compute environments like environment 100.

1.1 VSAN Modules

To manage and provide access to HC/OB storage 108, hypervisors 110(1)-110(M) of host systems 104(1)-104(M) include a software-based storage management (i.e., "VSAN") layer comprising VSAN modules 120(1)-120(M). As shown, VSAN modules 120(1)-120(M) are interconnected via a management network 124. Although a comprehensive discussion of the operation of VSAN modules 120(1)-120(M) is beyond the scope of this disclosure, VSAN modules 120(1)-120(M) are responsible for, among other things, enabling interactions between the storage tier represented by HC/OB storage 108 and storage clients or other external entities. For example, in one set of embodiments, VSAN modules 120(1)-120(M) can automate the creation of storage objects in object store 116 for new VMs and/or virtual disks that are provisioned by, e.g., administrators via virtualized management platform 106. In another set of embodiments, VSAN modules 120(1)-120(M) can process VM I/O requests that are directed to, e.g., virtual disks, swap space, etc. on object store 116, such that those I/O requests are properly routed to the host systems in cluster 102 that house the local storage resources backing the storage objects associated with the requested virtual disk data. In yet another set of embodiments, VSAN modules 120(1)-120(M) can expose APIs that allow other entities/modules to, e.g., modify storage object metadata, query information regarding the status or accessibility of certain storage objects (or groups of objects), and more.

Figure 2:
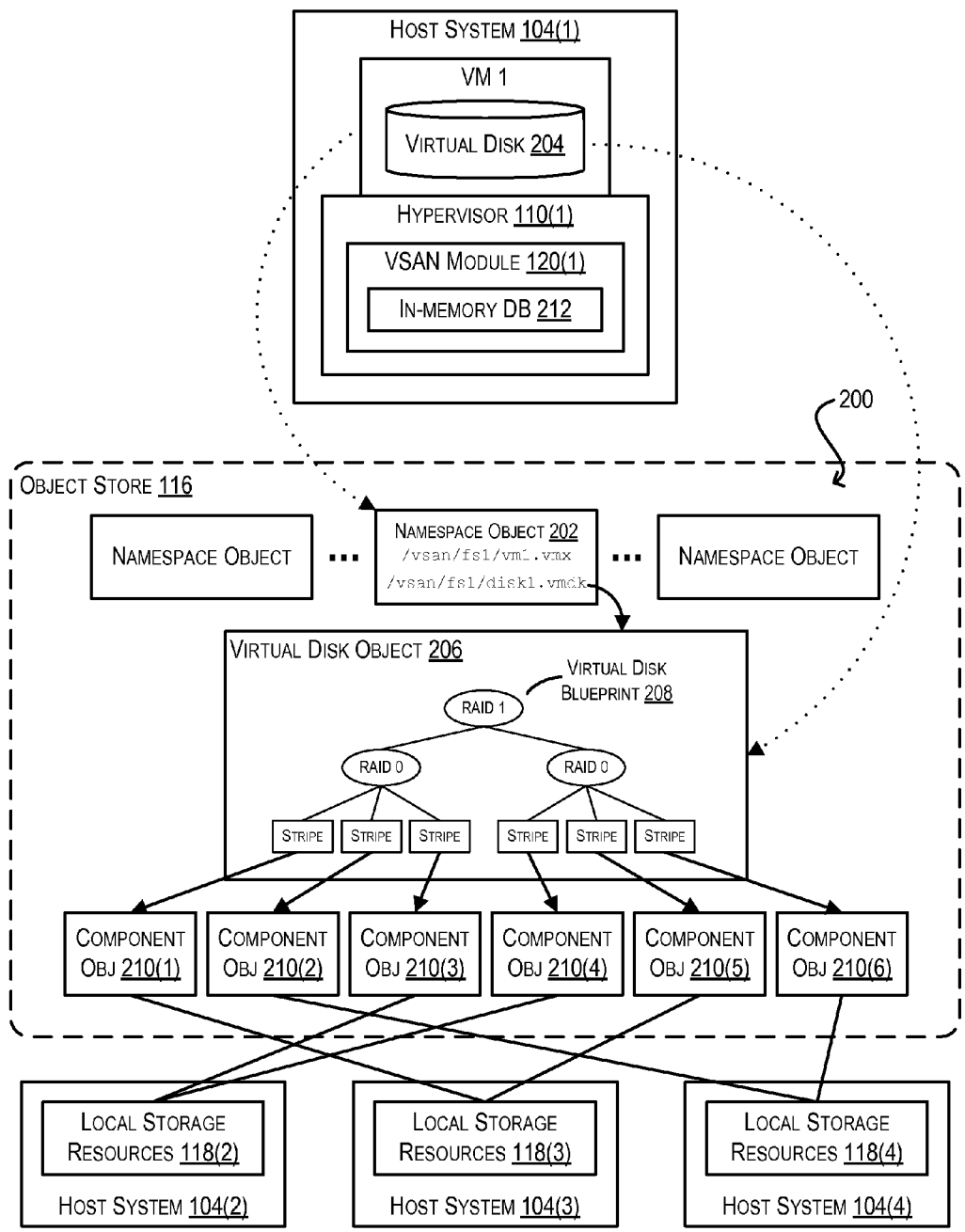
FIG. 2 depicts a hierarchical object structure for a VM stored on HC/OB storage according to an embodiment.

To clarify how VSAN modules 120(1)-120(M) may create a storage object representation of a newly provisioned VM in object store 116, FIG. 2 depicts an example object structure 200 for a "VM 1" running on host system 104(1) according to an embodiment. As shown, object structure 200 includes a top-level "namespace" object 202 that is one of multiple namespace objects in object store 116. Namespace object 202 corresponds to a representation of a file system (such as VMFS, NFS, etc.) that is used to store the files of VM 1 that represent part of the VM's state. In the specific embodiment of FIG. 2, namespace object 202 includes a configuration file for VM 1 (identified by the path "/vsan/fs1/vm1.vmx") and a virtual disk descriptor file for a virtual disk 204 used by VM 1 (identified by the path "/vsan/fs1/disk1.vmdk").

The virtual disk descriptor file within namespace object 202 includes, in turn, a pointer to a composite virtual disk object 206 (distinct from namespace object 202) that conceptually represents virtual disk 204. Object 206 includes metadata that describes a storage organization or configuration for virtual disk 204, referred to as an "object blueprint" 208. In one embodiment, VSAN modules 120(1)-120(M) may create this object blueprint at the time virtual disk 204 is provisioned based on one or more storage profiles for the virtual disk that are specified by, e.g., an administrator. Object 206 also includes references to a number of component objects 210(1)-210(6). Component objects 210(1)-210(6) hold the actual data for virtual disk 204 in accordance with the storage configuration identified in object blueprint 208. For example, in FIG. 2, component objects 210(1)-210(6) correspond to data stripes in a RAID 1/RAID 0 configuration per object blueprint 208.

Finally, as shown via the lines interconnecting component objects 210(1)-210(6) with host systems 104(2), 104(3), and 104(4), these component objects map to specific storage locations on the local storage resources of host systems 104(2)-104(4) respectively that back the data stripes represented by the objects. Like object blueprint 208, VSAN modules 120(1)-120(M) may determine these mappings in a way that satisfies one more storage profiles defined for virtual disk 204.

It should be appreciated that object structure 200 of FIG. 2 is illustrative and not intended to limit the embodiments described herein. Generally speaking, object structure 200 may include objects corresponding to any type of storage entity that VM 1 may consume/use, such as swap objects, memory checkpoint objects, file shares which are themselves contained within objects, and so on. One of ordinary skill in the art will recognize many variations, modifications, and alternatives.

As part of the process of creating object structure 200 within object store 116 (and at potentially other times), VSAN modules 120(1)-120(M) can cache, in an in-memory database 212 that is synchronized and replicated on every host system, detailed information regarding object structure 200, such as what composite and component objects are included in the structure, the relationships between objects, metadata associated with each object, and the mapping of objects to physical storage locations. In this way, each VSAN module 120(1)-120(M) can have this information readily available (for, e.g., recovery or I/O request processing purposes) without needing to access object store 116. VSAN modules 120(1)-120(M) may also use in-memory database 212 to cache other types of information that are relevant to their management of HC/OB storage 108, such a physical inventory of the local storage resources in host cluster 102, the performance characteristics of each local storage resource, quality of service requirements, cluster topology/health, and more.

1.2 HA Modules

In addition to VSAN modules 120(1)-120(M), each hypervisor 110(1)-110(M) of host cluster 102 includes a HA module 122(1)-122(M). In the embodiment of FIG. 1, HA modules 122(1)-122(M) are communicatively coupled via a management network 126 that is separate from management network 124 interconnecting VSAN modules 120(1)-120(M). However, in alternative embodiments, HA modules 122(1)-122(M) and VSAN modules 120(1)-120(M) may share the same management network.

Collectively, HA modules 122(1)-122(M) allow for high availability of VMs 112(1)-112(M) running within host cluster 102. For example, according to a typical HA implementation, when HA is first turned on (via, e.g., virtualization management platform 106), HA modules 122(1)-122(M) can communicate with each other to elect a master HA module. The master HA module is generally responsible for, e.g., monitoring the health of hosts and VMs in the cluster, orchestrating VM failovers/restarts in case of a failure, reporting cluster state and failover actions to virtualization management platform 106, and managing HA protection state. This last function involves managing information regarding which VMs in host cluster 102 should be protected for HA purposes. In existing HA implementations, the master HA module typically persists this HA protection state information to a centralized file on the storage tier (discussed in greater detail in Section 2 below).

The remaining, non-master modules can configure themselves to act as slave HA modules. Each slave HA module is generally responsible for, e.g., monitoring and forwarding local host/VM state changes to the master HA module, locally restarting VMs on its host system when directed by the master HA module, and participating in master election.

When the master HA module detects a host/VM/network outage (by, e.g., determining that it is no longer in communication with one or more slave HA modules), the master HA module can execute a failover/restart workflow for automatically restarting the VMs that are rendered inoperable by the failure. At a high level, this workflow can include identifying the VMs to be restarted, placing those VMs on active host systems in cluster 102 that have available capacity, and then transmitting commands to the slave HA modules on the respective host systems to initiate the restart process for each VM. In this manner, the master HA module (together with the slave HA modules) can ensure that the guest applications running within the affected VMs remain operational throughout the outage.

In addition, whenever one or more of HA modules 122(1)-122(M) are no longer in contact with a master HA module, those modules can perform a re-election to elect a new master. This may occur if, e.g., a failure in management network 126 causes some subset of HA modules 122(1)-122(M) to become partitioned from another subset including the current master HA module, or if the host system running the master HA module fails or becomes network isolated. In these situations, the cluster may comprise multiple master HA modules (one master per partition). This will remain the case until the failure(s) causing the network partition(s) are resolved, at which point all but one master HA module will abdicate.

Figure 3:
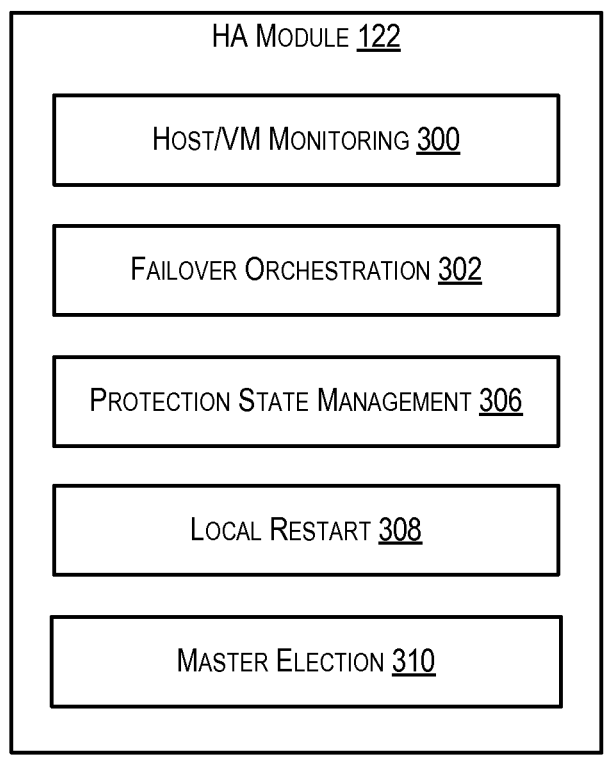
FIG. 3 depicts functional components of a HA module according to an embodiment.

For purposes of illustration, FIG. 3 depicts an exemplary HA module 122 comprising various functional components 300-310 according to an embodiment. These functional components generally map to the host/VM monitoring, failover orchestration, HA protection state management, local restart, and master election functions attributed to HA modules 122(1)-122(M) in the description above. Depending on the HA implementation, HA module 122 can also include other components or sub-components that are not specifically shown, or exclude one or more of the existing components. For instance, some HA implementations may not use a master/slave model, and instead implement group messaging among HA modules in "virtual synchrony." In these and similar embodiments, there would be no need for, e.g., master election component 310. One of ordinary skill in the art will recognize many variations, modifications, and alternatives.

2. Managing HA Protection State

As mentioned previously, in existing HA implementations, the master HA module of a host cluster generally saves HA protection state for the VMs running within the cluster to one or more centralized files on persistent storage. This arises out of the need for newly elected master HA modules to determine, at the time they are elected, which VMs should be protected for HA purposes. Without persisting this information in some way, the newly elected masters have no way of knowing which VMs they should monitor and failover/restart in the case of a failure (since the original master HA module that previously maintained this information may have failed or become network isolated or partitioned).

Figure 4:
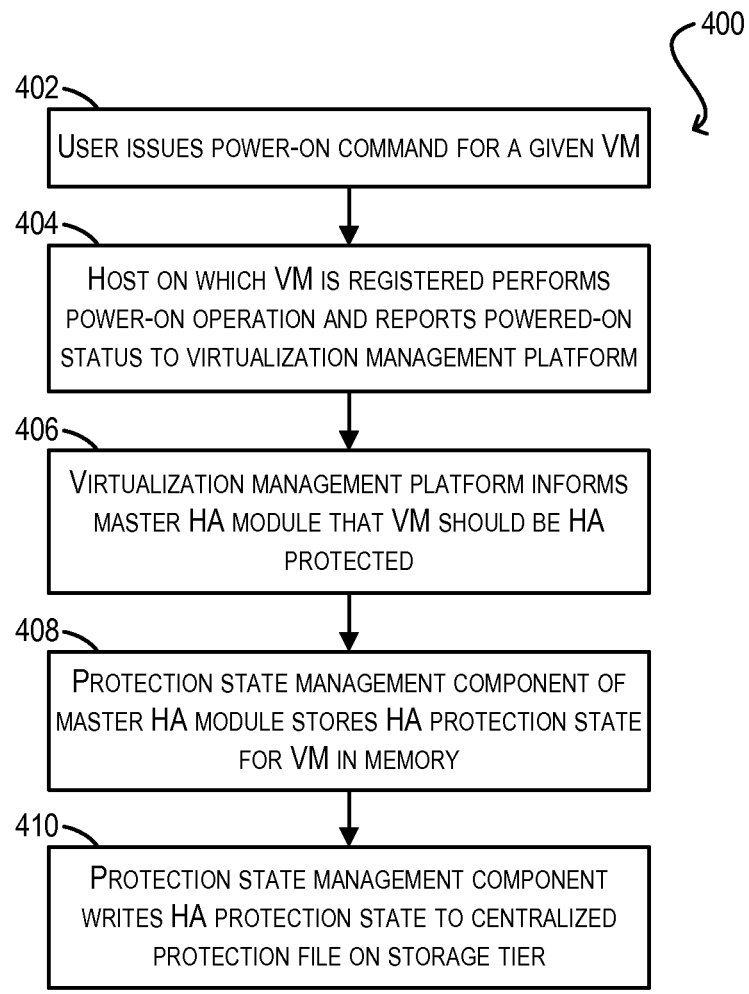
FIG. 4 depicts a flow diagram for persisting HA protection state for a VM in a centralized file.

By way of example, FIG. 4 depicts an exemplary flowchart 400 that may be performed by a master HA module for persisting HA protection state to a centralized file according to an existing HA implementation. In particular, FIG. 4 illustrates HA protection state processing that occurs when a VM is first powered in the master HA module's host cluster.

At block 402, a user issues a power-on command for a given VM. At block 404, the host system on which the VM is registered performs a power-on operation and reports the powered-on status of the VM to the virtualization management platform for the cluster. In response, the virtualization management platform informs the master HA module that the VM should be HA protected (block 406).

At block 408, the protection state management component of the master HA module stores the HA protection state for the VM in memory (so that it can be quickly retrieved by the master HA module on-demand). Finally, at block 410, the protection state management component writes the HA protection state for the VM to a centralized protection file on the storage tier of the cluster (so that it can be retrieved by other, newly elected master HA modules in the case that the current master goes down or becomes unavailable).

While the approach for persisting HA protection state shown in FIG. 4 works well in environments where the storage tier is implemented using dedicated shared storage (e.g., a SAN or NAS-based storage array), it can be problematic for environments where the storage tier is implemented using distributed object-based storage (like HC/OB storage 108 of FIG. 1). This is due to the varying and potentially asymmetric nature of object accessibility in such distributed storage systems—if the HA protection state is maintained in a centralized file in HC/OB storage (which, in turn, would be persisted as one or more storage objects across the HC/OB object store), there may be cases where a master HA module cannot access the file, even if the master HA module can access the VMs themselves. For example, assume that the centralized HA protection file is stored as two storage objects across hosts H3 and H5 of a host cluster comprising hosts H1, H2, H3, H4, and H5. If a failure causes H3 and H5 to be partitioned from H1, H2, and H4, a master HA module in the [H1, H2, H4] partition will not be able to restart any VMs because it will not have access to the HA protection file in the [H3, H5] partition. This would remain true even if all of the VMs in the cluster were maintained within, and thus accessible from, the [H1, H2, H4] partition. Further, after a network partition is resolved, merging updates to the HA protection file that are performed during the partition can be complicated (or may not be possible at all).

To address the foregoing and other similar issues, in certain embodiments each master HA module can persist the HA protection state for a VM within one or more storage objects of the VM on the HC/OB storage tier, rather than in a centralized file. Stated another way, each master HA module can co-locate the HA protection state for a VM with the persistent configuration of that specific VM. With this approach, if a host/master HA module can access the VM's configuration information on HC/OB storage, the host/master HA module can also access the VM's protection state information (and thus, the master HA module can make an attempt to failover/restart the VM as needed). This also ensures that, when a VM is powered on, the master HA module in the cluster/partition where the VM is registered will always be able to persist the HA protection state for the VM.

There are a number of different ways in which HA protection state can be co-located with VM state in HC/OB storage (e.g., as a distinct file the VM's file system, as object metadata, etc.). According to a particular embodiment, each master HA module can store the HA protection state for a given VM as part of the metadata of the VM's namespace object in the HC/OB object store. This embodiment can be advantageous in certain scenarios. For example, recall that each VSAN module caches, in a synchronized in-memory database (i.e., database 212 of FIG. 2), information about the storage objects in the object store. As part of this process, in some embodiments, each VSAN module can automatically cache the metadata for each VM namespace object (and potentially other storage objects) in the in-memory database. Thus, in these embodiments, when a newly elected master HA module needs to retrieve the HA protection state for all VMs in a cluster/partition (e.g., following a failure or at other times), the newly elected HA module can query the VSAN layer, which in turn can quickly retrieve the HA protection state from the in-memory database (rather than from HC/OB storage). This can significantly speed up the protection state retrieval process, which is important since any lag between the time a master HA module is elected and the time at which it knows which VMs to protect can potentially result in unhandled failures. If the HA protection state for each VM were stored as a separate file within each VM's file system, the VSAN layer (or some other component) would need to discover all of the file locations, enumerate the files, and then open/read/close each file, which can be a very time-consuming process.

Figure 5:
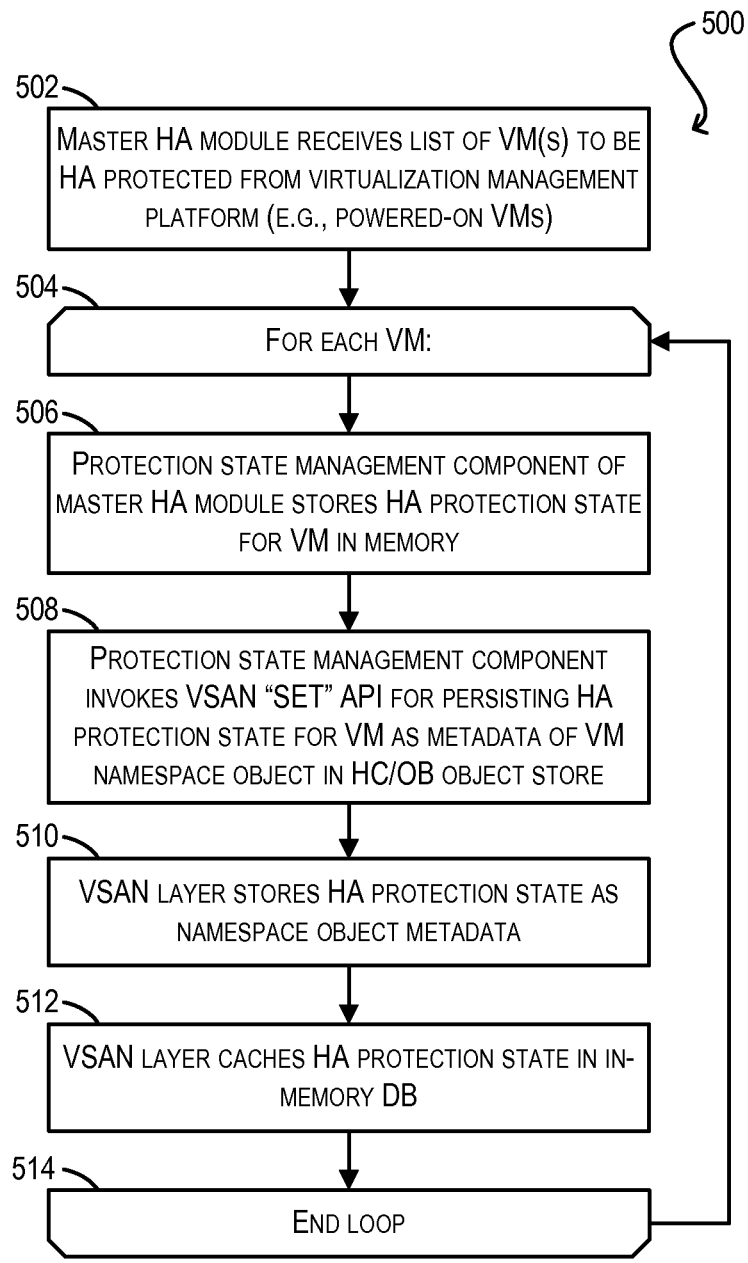
FIG. 5 depicts a flow diagram for persisting HA protection state for a VM in a namespace object of a VM according to an embodiment.

FIG. 5 depicts a flowchart 500 that may be performed by a master HA module for persisting HA protection state for a VM to the VM's namespace object according to an embodiment. For instance, flowchart 500 may be performed by a particular HA module 122(X) in host cluster 102 of FIG. 1 that has been elected to carry out master duties.

At block 502, master HA module 122(X) can receive a list of one or more VMs to be HA protected from, e.g., virtualization management platform 106. This may occur when one or more VMs are powered on (as in flowchart 400 of FIG. 4) or at other times. In one embodiment, the list of VMs identifies the VMs as well as the host systems on which the VMs are registered for execution.

At block 504, master HA module 122(X) can enter a loop for each VM. Within the loop, protection state management component 306 of master HA module 122(X) can first store HA protection state for the VM in memory. The HA protection state can be embodied in various ways, such as a "protected" flag or some other value.

Protection state management component 306 can then invoke, e.g., a "SET" API exposed by the VSAN layer for persisting the VM's HA protection state as metadata for the VM's namespace object in HC/OB object store 116 (block 508). In a particular embodiment, this API can be a generic metadata SET API that can be used to update any metadata field of the namespace object. In this embodiment, the generic SET API can take as input a key-value pair that identifies the metadata field to be populated and the corresponding value. The generic SET API can also optionally take as input a "service identifier" that identifies the service component or layer that is performing the metadata update (in this case, HA). In other embodiments, the SET API can be specifically tailored to set HA protection state within the namespace object.

Upon receiving the invocation of the SET API, the VSAN layer (in particular, the VSAN module of the host system on which the master HA module is located, in concert with potentially other VSAN modules on other host systems) can cause the HA protection state for the VM to be added to the VM's namespace object metadata in object store 116 (block 510). As noted above, the HA protection state can be stored as, e.g., a "protected" flag or some similar indicator/value. The VSAN layer can subsequently cache the HA protection state in in-memory database 212 and return a completion message to master HA module 122(X). In response, master HA module 122(X) can reach the end of the VM loop (block 514) and iterate though blocks 504-514 until all of the VMs have been processed.

It should be noted that, although flowchart 500 and certain other subsequent flowcharts illustrate VMs as being processed serially in a loop, in alternative embodiments these steps can be carried out on multiple VMs at the same time (e.g., via batching). Further, in cases where the host system on which master HA module 122(X) is running cannot access HC/OB storage 108, master HA module 122(X) can cause the SET API described above to be executed via a slave HA module. For example, master HA module 122(X) can send a message to the slave HA module to invoke the API, or can directly invoke the API via a remote procedure call. This embodiment is described in further detail in Section 4.2 below.

Figure 6:
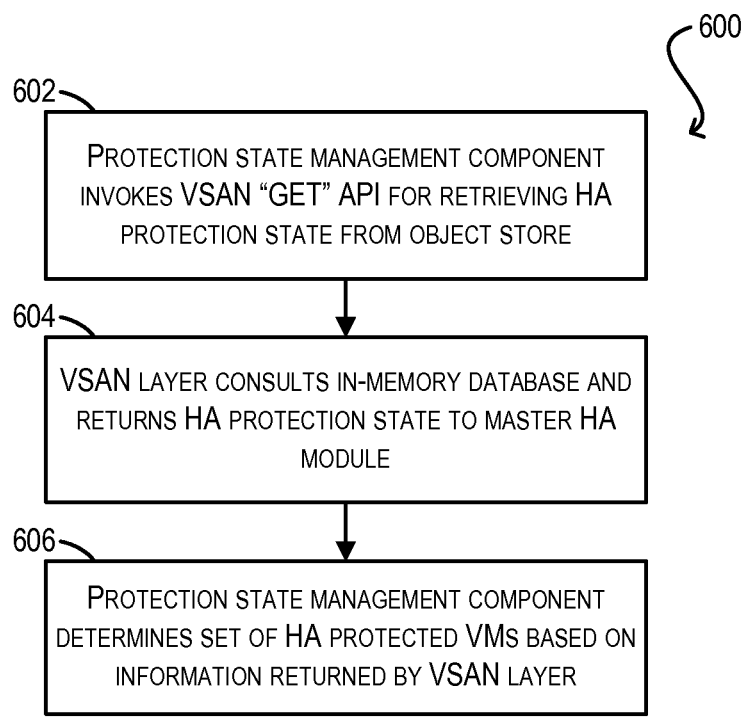
FIG. 6 depicts a flow diagram for retrieving HA protection state according to an embodiment.

FIG. 6 depicts a flowchart 600 that may be performed by a master HA module for accessing HA protection state that has been persisted per flowchart 500 of FIG. 5 according to an embodiment. For instance, flowchart 500 may be performed by a HA module 122(Y) in host cluster 102 of FIG. 1 that has been elected as a new master in response to, e.g., a failure/partitioning/isolation of master HA module 122(X) that executed flowchart 500.

At block 602, protection state management component 306 of master HA module 122(Y) can invoke a VSAN GET API for retrieving the HA protection state for the VMs in host cluster 102 from object store 116. Like the SET API discussed with respect to block 508 of FIG. 5, this GET API can be a generic API that can be used to retrieve the value(s) of any metadata field of any namespace object (or group of namespace objects), or a non-generic API that is specifically designed for retrieving HA protection state.

At block 604, the VSAN layer can receive the API invocation and can consult in-memory database 212 to retrieve and return the requested HA protection state to master HA module 122(Y). This step can comprise, e.g., accessing the cached namespace object metadata for each VM in database 212. As mentioned previously, since the VSAN layer does not need to hit physical storage in order to perform this retrieval operation, master HA module 122(Y) can more quickly determine which VMs it needs to protect when compared to other persistence techniques.

Finally, at block 606, protection state management component 306 of master HA module 122(Y) can determine the currently-known set of HA protected VMs based on the information returned by the VSAN layer at block 604.

In certain embodiments, the API invocation at block 602 of flowchart 600 will only return the HA protection state information that the VSAN layer can access from HC/OB storage 108 at that time. Due to failures, it is possible some HA protection state information is not accessible. To account for this situation, in one embodiment (not shown), master HA module 122(Y) can re-invoke the GET API after the VSAN layer informs the master HA module of a change in accessibility of any storage objects. This re-invocation may cause the master HA module to determine that additional VMs are, in fact, HA protected.

It should be appreciated that the embodiments described above are illustrative and that other approaches are also possible for persisting/managing HA protection state for VMs stored on HC/OB storage. For example, according to one alternative approach, the VSAN layer itself may be modified to support the storage of a file that can be concurrently accessed by host systems in different network partitions. With this approach, HA protection state can remain within a centralized file as in current HA implementations, since all master HA modules would be able to read it (regardless of how the cluster is partitioned). One implementation of this approach may, for simplicity, allow only one master HA module to write to the centralized file at a time. This "write-enabled" master may be selected via, e.g., a third party witness. Another implementation may allow multiple concurrent writers, with the host system of each master HA module owning a segment of the file for write purposes.

3. HA Failover/Restart Workflow

In addition to protection state management, another aspect of HA that is affected by the use of a HC/OB storage system for VM data storage is the VM restart/failover workflow orchestrated by master HA modules in the event of a failure. As discussed in Section 1.2 above, a conventional version of this workflow comprises (1) identifying the VMs to be restarted, (2) placing those VMs on active host systems that have available capacity and which can access the VM's devices including storage, and (3) transmitting commands to the slave HA modules on the respective host systems to initiate the restart process for each VM. Unfortunately, this conventional version fails to take into account the fact that, when a VM is stored on HC/OB storage, the accessibility of the VM's objects cannot be determined via a storage-container check, and hence there may be cases where the VM cannot be restarted because one or more of its storage objects are not yet accessible to the host system executing on the master HA module (and/or to the host system on which the restart is being attempted). This, in turn, can result in multiple continuous VM restart attempts, which can increase the load on the affected host systems and can delay the restart of other VMs.

Figure 7:
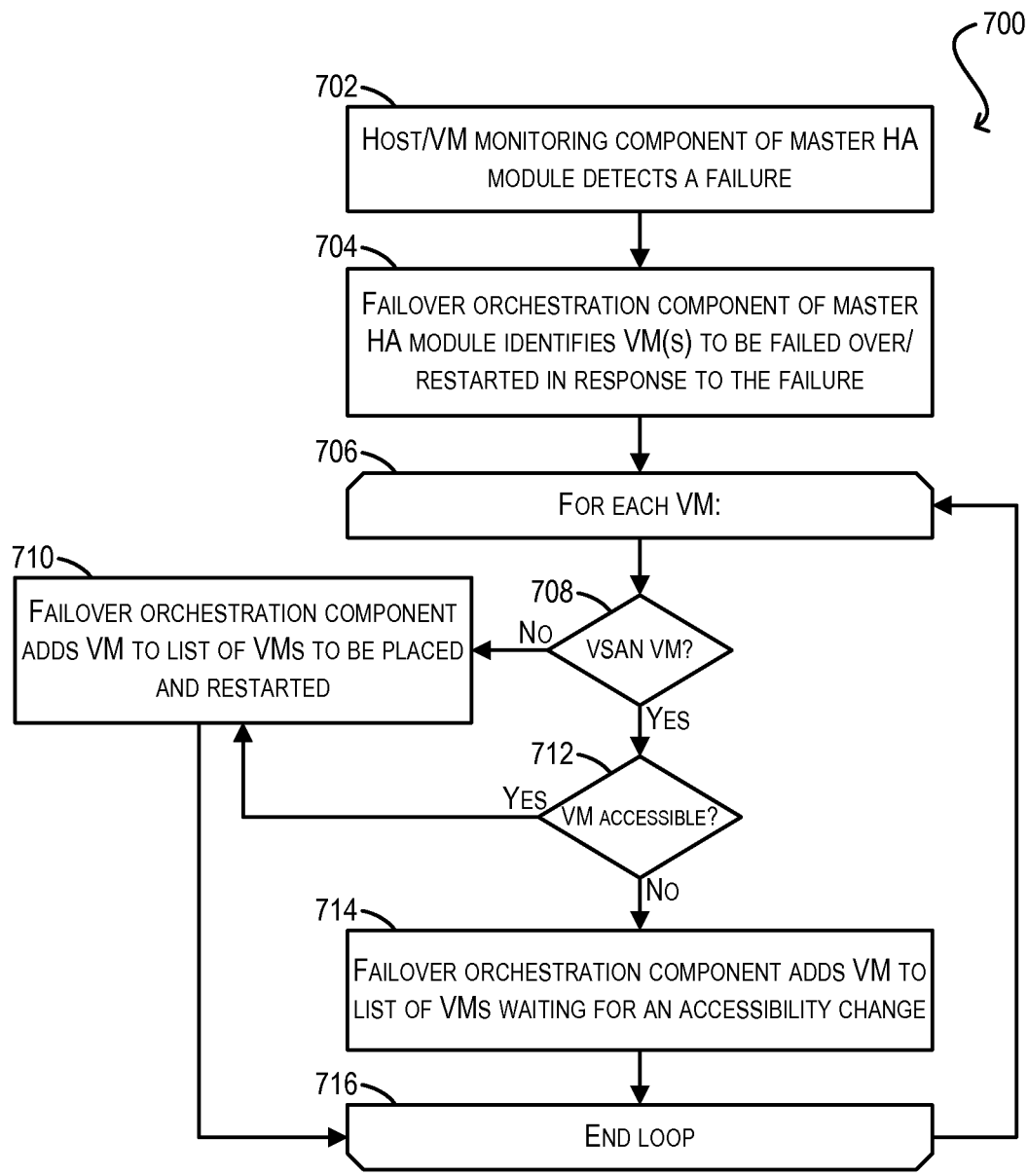
FIGS. 7, 8, and 9 depict flow diagrams for executing a HA failover/restart workflow according to an embodiment.
Figure 8:
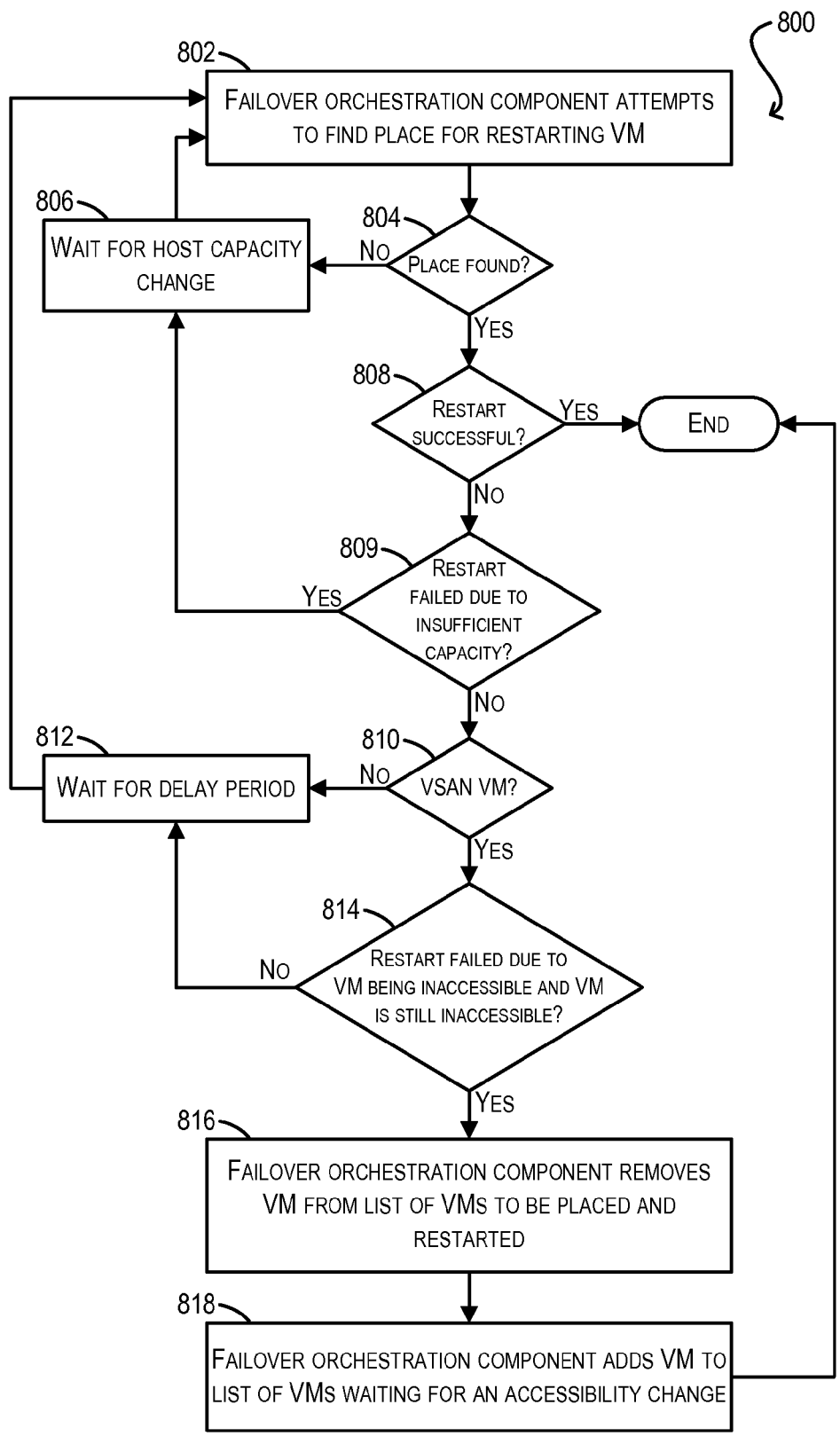
Figure 9:
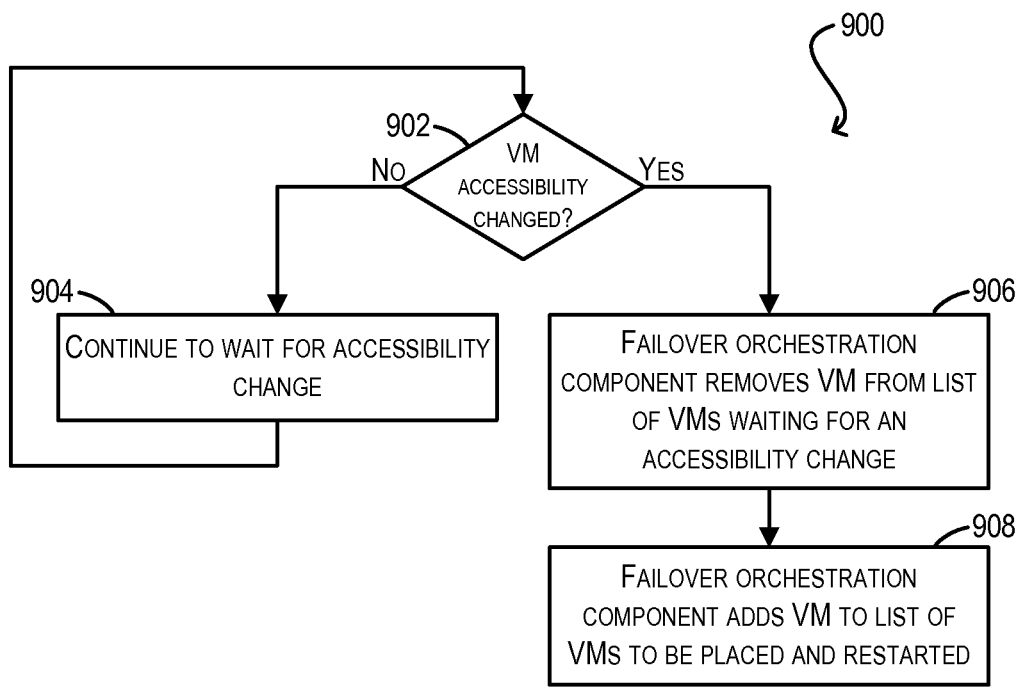

To address this, FIGS. 7, 8, and 9 depict a modified HA failover/restart workflow (comprising flowcharts 700, 800, and 900 respectively) that can be performed by a master HA module (e.g., 122(X) of FIG. 1) according to an embodiment. At a high level, this modified workflow can check whether a given VM is accessible by the host system on which the master HA module is located before the master HA module attempts to restart it, thereby reducing the total number of unsuccessful VM restart attempts (and thus, the load on the system).

Starting with flowchart 700 of FIG. 7, at block 702, host/VM monitoring component 300 of master HA module 122(X) can detect a failure within host cluster 102 that necessitates the failover of one or more VMs. At block 704, failover orchestration component 302 of master HA module 122(X) can identify the VM(s) to be failed-over/restarted in response to the failure. For example, in one embodiment, failover orchestration component 302 can identify these VMs based on the HA protection state information discussed with respect to Section 2 above.

At block 706, failover orchestration component 302 can enter a loop for each VM identified at block 704. Within the loop, failover orchestration component 302 can first determine whether the VM is a "VSAN VM" (i.e., a VM whose state is stored on HC/OB storage 108) (block 708). If not, failover orchestration component 302 can add the VM to a "restart list" of VMs to be immediately placed and restarted (block 710). As discussed with respect to flowchart 800 of FIG. 8 below, another thread/process of failover orchestration component 302 can asynchronously process this restart list to place and restart the listed VMs. The VM loop can then end (block 716), and failover orchestration component 302 can return to block 706 to iterate through the loop again, if needed, to handle additional VMs.

If failover orchestration component 302 determines that the VM is not a VSAN VM at block 708, component 302 can move on to checking whether the VM is accessible (block 712). For example, in one embodiment, block 712 can comprise determining whether all of the VM's storage objects can be accessed by the host system of master HA module 122(X) from HC/OB storage 108. In a particular embodiment, this check can be carried out by invoking an appropriate query API exposed by the VSAN layer. If the VM is accessible, failover orchestration component 302 can add the VM to the restart list as described above (block 710).

On the other hand, if the VM is inaccessible, failover orchestration component 302 can add the VM to a "wait list" of VMs waiting for an accessibility change (block 714). As discussed with respect to flowchart 900 of FIG. 9 below, another thread/process of failover orchestration component 302 can asynchronously process this wait list to wait for the accessibility of the VMs on the list to change before restarts for those VMs are attempted. The VM loop can then end (block 716), and failover orchestration component 302 can return to block 706 to iterate through the loop again, if needed, to handle additional VMs.

Turning now to FIG. 8, flowchart 800 depicts a sub-flow that can be performed by an independent thread/process of failover orchestration component 302 of master HA module 122(X) for processing the restart list noted at block 710 of FIG. 7 according to an embodiment. In the embodiment of FIG. 8, flowchart 800 is performed in the context of a particular VM on the restart list (and thus should be repeated for all other VMs on the list).

At block 802, failover orchestration component 302 can first attempt to find a place for restarting the current VM. In other words, failover orchestration component 302 can attempt to find an active host system within host cluster 102 that is suitable for hosting execution of the VM. In one embodiment, this placement step may take into account the available compute (e.g., CPU, memory, etc.) capacity of each active host system, and/or other factors.

If failover orchestration component 302 cannot find a place for the VM (block 804), component 302 can wait for a host capacity change (block 806) and can subsequently return to block 802.

If a place for the VM can be found at block 804, failover orchestration component 302 can initiate the VM restart process on the identified host system (not shown). Failover orchestration component 302 can then check whether the restart was successful (block 808). If so, flowchart 800, and the overall restart workflow for this VM, can end.

If the restart was unsuccessful, failover orchestration component 302 can check whether the restart failed due to insufficient capacity at the selected host system (block 809). If so, component 302 can wait for a host capacity change as noted above (block 806) and can return to block 802.

However, if the restart did not fail due to insufficient host capacity, failover orchestration component 302 can perform a series of steps to determine whether the failed restart was caused by a VM/object accessibility issue. In particular, at block 810, failover orchestration component 302 can check whether the VM is a VSAN VM. If not, failover orchestration component 302 can conclude that the failed restart was due to some transient issue on the target host system, and thus can wait for a delay period before re-attempting the restart process (block 812).

On the other hand, if the VM is VSAN VM, failover orchestration component 302 can check whether the restart failed because the VM was inaccessible, and whether the VM is still currently inaccessible. In one embodiment, component 302 can perform this check by, e.g., invoking the same query API used at block 708 of FIG. 7 (block 814). This second accessibility check is useful because, in certain embodiments, the accessibility of the VM may change between the first check performed at block 708 and the actual restart of the VM at block 808.

If the VM is accessible at block 814, failover orchestration component 302 can wait for a delay period (block 812) and subsequently return to block 802. Otherwise, failover orchestration component 302 can remove the VM from the restart list and add it to the wait list (blocks 816 and 818). In this way, failover orchestration component 302 can put off any further restart attempts for this VM until its stored objects are accessible.

Turning now to FIG. 9, flowchart 900 depicts a sub-flow that can be performed by an independent thread/process of failover orchestration component 302 of master HA module 122(X) for processing the wait list noted at block 714 of FIG. 7 and block 818 of FIG. 8 according to an embodiment. In the embodiment of FIG. 9, flowchart 900 is performed in the context of a particular VM on the wait list (and thus should be repeated for all other VMs on the list).

At block 902, failover orchestration component 302 can check whether the accessibility of the current VM has changed. Such a change may occur due to, e.g., a "resolution event" that causes the VM, and potentially other VMs in the cluster, to become available again. In one set of embodiments, failover orchestration component 302 can perform this check by waiting for a notification from the VSAN layer that the VM's accessibility has changed. In these embodiments, failover orchestration component 302 can register for the notification by, e.g., registering for a callback exposed by the VSAN layer.

It should be noted that, in some cases where a resolution event occurs, the VSAN layer may not become aware that the storage objects of all VMs affected by the event have become accessible at exactly the same moment. Rather, it may take some time for the VSAN layer to determine the accessibility of VM 1, the accessibility of VM 2, and so on. Accordingly, in certain embodiments, the VSAN layer may be configured to issue multiple "accessibility changed" notifications in response to a resolution event. For instance, each successive notification can report the VMs whose storage objects have become accessible since the last notification. The notifications can be issued on a fixed time interval (e.g., one every minute) or as objects/VMs become accessible. With this approach, the average time needed to restart VSAN VMs can be reduced.

If failover orchestration component 302 determines that the current VM is not yet accessible at block 902, component 302 can continue to wait for an accessibility change (block 904) and return to block 902.

However, if the VM becomes accessible at block 902, failover orchestration component 302 can remove the VM from the wait list and add it to the restart list (blocks 906 and 908). As a result, component 302 can subsequently place and restart the VM (whose stored state is now fully accessible) per the processing of flowchart 800 of FIG. 8.

It should be appreciated that the embodiments described above for modifying the conventional HA failover/restart workflow are illustrative and numerous variations and alternatives are possible. For example, in some embodiments, as part of the "accessibility changed" notification step described at block 902 of FIG. 9, the VSAN layer may not be able to notify master HA module 122(X) when a particular VM has become accessible; rather, the VSAN layer may only be able to notify master HA module 122(X) when one or more storage objects of any VM in the cluster have become accessible. To account for this, when failover orchestration component 302 of master HA module 122(X) receives the notification, component 302 can re-invoke the accessibility query API for each VM in the wait list in order to identify the specific VM whose storage object(s) have become accessible.

In addition, in some embodiments, the accessibility query API exposed by the VSAN layer may not be able to return a definite answer as to whether a VM is accessible; instead, the API may only be able to indicate whether a VM's namespace object is accessible. In these scenarios, the same failover/restart workflow shown in FIGS. 7, 8, and 9 may be used, but master HA module 122(X) may need to attempt more VM restarts (since the restart for a given VM will fail if a full copy of the VM's persistent data, such as its virtual disks, is not accessible).

4. Network Partition Scenarios

When a failure splits the host systems in a host cluster into two or more network partitions, the HA and VSAN modules in the cluster may or may not observe the same partitions. For example, if the HA and VSAN modules share the same management network, they will generally observe the same partitions (since a failure in the management network will split both groups of modules in the same manner). However, if the HA and VSAN modules do not share the same management network (as in environment 100 of FIG. 1), there may be cases where a network failure splits one group of modules but not the other, or splits the two groups of modules in non-identical ways. There are generally four partition scenarios to consider:

1. The HA modules observe a partition but the VSAN modules do not
2. The VSAN modules observe a partition but the HA modules do not
3. The HA and VSAN modules observe identical partitions
4. The HA and VSAN modules observe non-identical partitions Some of the scenarios above may require enhancements to the HA protection state persistence and HA failover/restart techniques described in Sections 2 and 3 so that those techniques can operate efficiently. These enhancements are detailed in the sub-sections that follow.

4.1 Partition Scenario 1

In this scenario, the HA modules observe a partition but the VSAN modules do not. With respect to environment 100 of FIG. 1, this may occur if, e.g., there is a failure in management network 126 interconnecting HA modules 122(1)-122(M), but there is no failure in management network 124 interconnecting VSAN modules 120(1)-120(M).

If scenario 1 occurs, the group of HA modules in each partition will elect a master HA module, such that there are multiple master HA modules (one per partition). The master HA module in each partition will be able to read and write the HA protection state for all VMs in the host cluster, because the VSAN layer has full visibility of the entire HC/OB object store. Accordingly, no changes are needed for the HA protection state persistence/retrieval flows described in Section 2 to accommodate this scenario.

In terms of HA failover/restart, each master HA module will, in parallel, attempt to restart each VM within the master module's partition. In certain embodiments, no mechanism may be provided to prevent concurrent VM restart attempts by different master HA modules in different partitions. Nevertheless, generally speaking, only one instance of each VM will actually power-on, because VM power-on requires, in one embodiment, an exclusive lock to be held on one of the VM's files (and thus only one master HA module will obtain this lock and successfully power-on the VM). This means that changes are also not needed for the failover/restart workflow described in Section 3 to accommodate this scenario.

4.2 Partition Scenario 2

Figure 10:
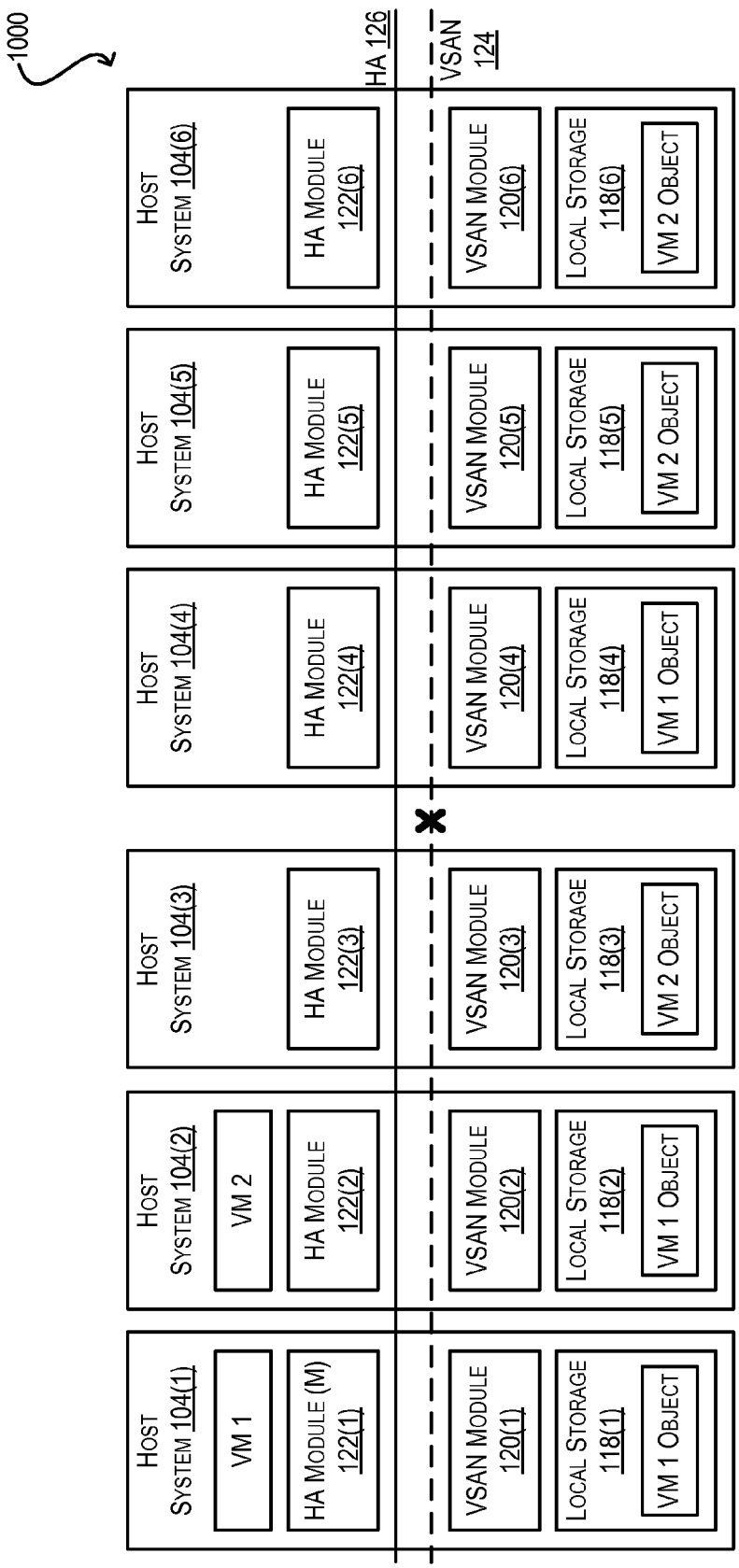
FIG. 10 depicts a partition scenario in which the VSAN modules of a host cluster observe a network partition but the HA modules of the host cluster do not according to an embodiment.

In this scenario, the VSAN modules observe a partition but the HA modules do not. One example of this scenario is illustrated in FIG. 10, which depicts a host cluster 1000 of six host systems 104(1)-104(6) in which there is a failure in management network 124 interconnecting VSAN modules 120(1)-120(6) (that splits the cluster into two partitions [104(1), 104(2), 104(3)] and [104(4), 104(5), 104(6)]), but there is no failure in management network 126 interconnecting HA modules 122(1)-122(6). Thus, master HA module 122(1) on host system 104(1) (identified by the "M" designation) is able to communicate with slave HA modules 122(2)-122(6) on host systems 104(2)-104(6), while the VSAN modules can only communicate with the other VSAN modules in their particular partition.

Scenario 2 raises the following issues:

A. When a master HA module needs to update the metadata for a VM namespace object (e.g., in order to persist/modify the VM's HA protection state), the master HA module's host system may not be able to access the namespace object, while the host systems of one or more slave HA modules can. This is because the VM namespace object will only be accessible in the VSAN partition where there is a quorum of storage objects for that VM. For instance, in FIG. 10, master HA module 122(1) on host system 104(1) cannot access the namespace object of VM 2 (since the majority of VM 2's objects are in the [104(4), 104(5), 104(6)] partition), while slave HA modules 122(4)-122(6) on host systems 104(4)-104(6) can.

B. When a master HA module attempts to restart a VM, the master HA module may not know which specific host systems, if any, have access to the VM for placement purposes. For instance, in FIG. 10, if host system 104(2) (which is running VM 2) fails, master HA module 122(1) on host system 104(1) does not know that VM 2 may only be placed/restarted on host systems 104(4), 104(5), or 104(6), since only those host systems can access VM 2's objects.

C. When the accessibility of a VM changes, this change may not be visible to the host system on which the master HA module is running. For instance, in FIG. 10, if host system 104(5) fails and then recovers, master HA module 122(1) on host system 104(1) should be made aware that the accessibility of VM 2 has changed. But, since VSAN module 120(5) is partitioned from the VSAN module 120(1), master HA module 122(1) cannot be notified.

D. When a master HA module is newly elected, some VMs may be inaccessible to the host system on which the master is running and thus the master HA module may not know that they need to be restarted after a failure.

For issues A and B above, at least three solutions are possible: (1) the master HA module queries each slave HA module to learn whether that slave HA module can access a particular VM; (2) the VSAN module (or some other component) on each host system publishes the set of VMs that are accessible from that host, and this set is forwarded to the master HA module by each slave HA module; and (3) the master HA module uses trial-and-error when attempting to update the metadata of a VM or when trying to restart it.

For issue C above, the master HA module can inform the slave HA modules of the VMs that the master is interested in tracking for accessibility change purposes. The slave HA modules can then report back to the master when a given VM becomes accessible to the respective host systems of the slaves.

For issue D above, the master HA module can periodically ask each slave HA module to call the GET API to retrieve the HA protection state information for accessible VMs. The master HA module can subsequently compare the information received from the slave HA modules with what it had previously obtained. Based on this comparison, if there are any new VMs that are not currently running, the master HA module can attempt to restart those VMs.

Figure 11:
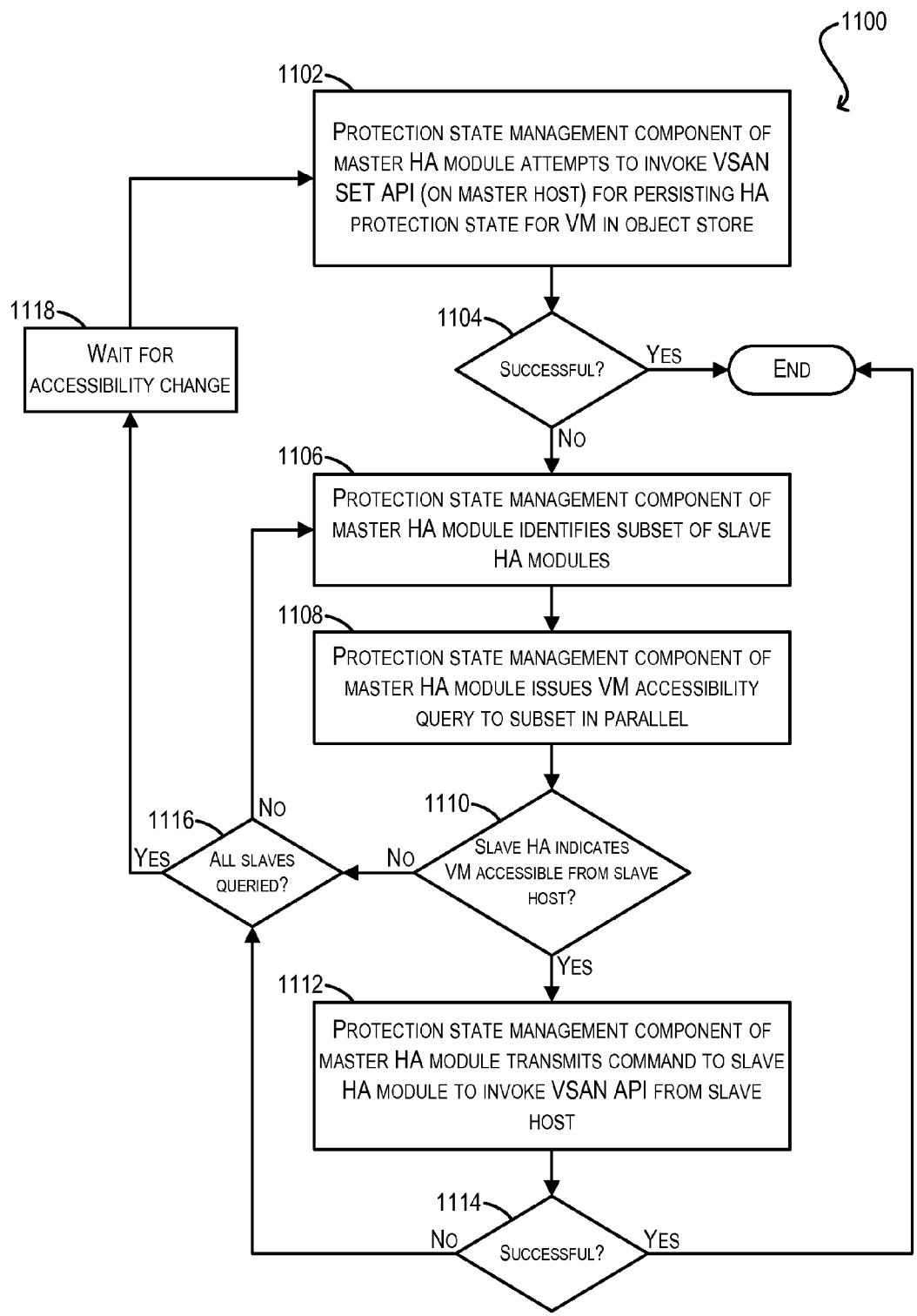
FIG. 11 depicts a flow diagram for persisting HA protection state in the scenario of FIG. 10 according to an embodiment.

FIG. 11 depicts a flowchart 1100 that can be performed by, e.g., master HA module 122(1) of FIG. 10 for solving issue A (metadata update) via solution 1 above. In a particular embodiment, master HA module 122(1) can perform flowchart 1100 as part of block 508 of the HA protection state persistence flow shown in FIG. 5.

Starting with block 1102, protection state management component 306 of master HA module 122(1) can attempt to invoke the VSAN SET API (on host system 104(1)) for persisting the protection state of a VM (e.g., VM 2) in HC/OB object store 116. If this invocation completes successfully at block 1104 (meaning that host system 104(1) has access to the VM's namespace object), flowchart 1100 can end (block 1104).

On the other hand, if the invocation of the VSAN SET API does not complete successfully at block 1104, protection state management component 306 can identify a subset of slave HA modules 122(2)-122(6) and can issue a VM accessibility query to the subset in parallel (blocks 1106 and 1108). This subset could be determined, for example, by querying the VSAN layer for the hosts that the current host can access over the management network 124, and then excluding these from the subset queried in block 1106. This VM accessibility query can effectively ask the target HA module whether the host system on which it is running has access to the VM.

If a particular slave HA module in the subset sends a response message indicating that its host system can access the VM (block 1110), protection state management component 306 of master HA module 122(1) can transmit a command to that slave HA module with instructions to invoke the VSAN SET API from its respective host system (block 1112). If this remote invocation is successful (block 1114), flowchart 1100 can end.

However, if no slave HA module in the subset indicates that its host system can access the VM at block 1110 (or if the remote invocation at block 1112 is unsuccessful), protection state management component 306 of master HA module 122

(1) can check whether all of the slave HA modules have been queried. If not, component 306 can select a new subset at block 1106 and repeat the subsequent steps of flowchart 1100.

Finally, if protection state component 306 determines that all slave HA modules have been queried at block 1116, component 306 can add the VM to the "wait for accessibility change list" described with respect to FIGS. 7-9 (block 1118) and can subsequently return to block 1102.

Figure 12:
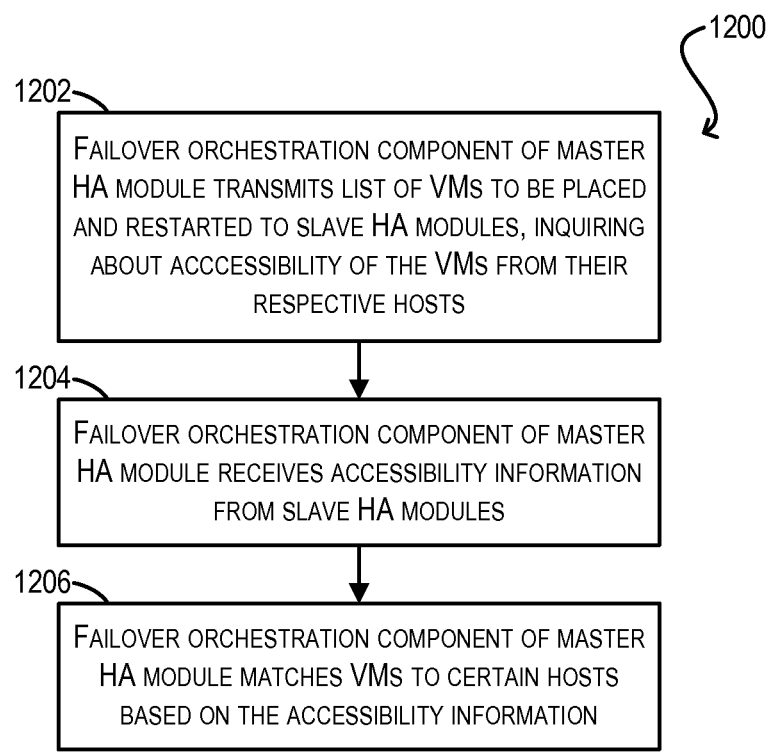
FIG. 12 depicts a flow diagram for determining host placement during a failover workflow in the scenario of FIG. 10 according to an embodiment.

FIG. 12 depicts a flowchart 1200 that can be performed by, e.g., master HA module 122(1) of FIG. 10 for solving issue B (determining VM accessibility for placement/restart) via solution 1 above. In a particular embodiment, master HA module 122(1) can perform flowchart 1200 as part of block 802 of the HA failover/restart sub-flow shown in FIG. 8.

At block 1202, failover orchestration component 302 of master HA module 122(1) can transmit a list of VMs to be placed and restarted to slave HA modules 122(2)-122(6) for the purpose of inquiring about the accessibility of the VMs from their respective host systems.

At block 1204, failover orchestration component 302 can receive the requested accessibility information from the slave HA modules. Failover orchestration component 302 can then match the VMs to certain host systems based on the received accessibility information (block 1206).

Figure 13:
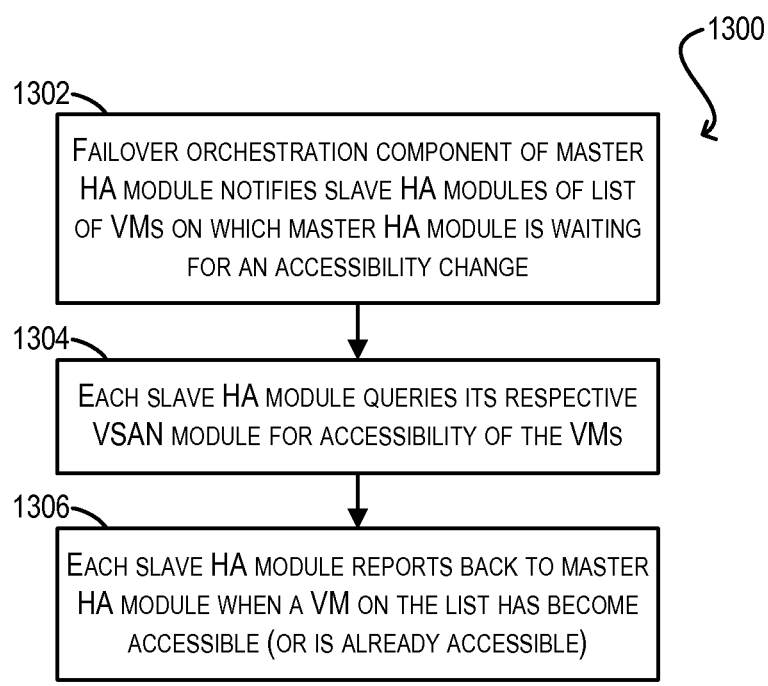
FIG. 13 depicts a flow diagram for propagating VM accessibility changes to a master HA module in the scenario of FIG. 10 according to an embodiment.

FIG. 13 depicts a flowchart 1300 that can be performed by, e.g., master HA module 122(1) of FIG. 10 for solving issue C (accessibility change visibility) above. In a particular embodiment, master HA module 122(1) can perform flowchart 1300 prior to block 902 of the HA failover/restart sub-flow shown in FIG. 9.

At block 1302, failover orchestration component 302 of master HA module 122(1) can notify slave HA modules 122(2)-122(6) of the "wait list" of VMs on which master HA module 122(1) is waiting for an accessibility change notification.

In response, each slave HA module can query (via the accessibility query API discussed with respect to FIGS. 7 and 8) its respective VSAN module for accessibility of the VMs on the list (block 1304).

Finally, at block 1306, each slave HA module can report back to master HA module 122(1) when a VM on the list has become accessible (or is already accessible).

It should be appreciated that FIGS. 11-13 are illustrative and various modifications/alternatives are possible. For example, in FIG. 11, the master HA module may not need to attempt to execute the VSAN SET API on the host of each slave HA module. Rather, when an attempt fails on a host X, the VSAN module of host X can return the IDs of the hosts that the VSAN module can communicate with over VSAN network 124. The master HA module can then use this information to make only one attempt per partition rather than one attempt per host.

4.3 Partition Scenario 3

In this scenario, the HA and VSAN modules observe identical partitions. With respect to environment 100 of FIG. 1, this may occur if, e.g., there are failures at identical points in management networks 126 and 124 respectively. Alternatively, this scenario may occur if the HA and VSAN modules share the same management network and there is a failure on that shared network.

Scenario 3 is similar to scenario 1 in that the group of HA modules in each partition will elect a master HA module, such that there are multiple master HA modules (one per partition). The master HA modules in each partition will only be able to read and write the HA protection state for the VMs that are accessible from within the master's partition; however, each VM should be accessible to one master HA module. Accordingly, no changes are needed for the HA protection state persistence/retrieval flows described in Section 2 to accommodate this scenario.

In terms of HA failover/restart, each master HA module will attempt to restart its accessible VMs within its partition. To accomplish this, the master HA modules can follow the failover/restart workflow described in Section 3, without any specific changes or enhancements.

4.4 Partition Scenario 4

Figure 14:
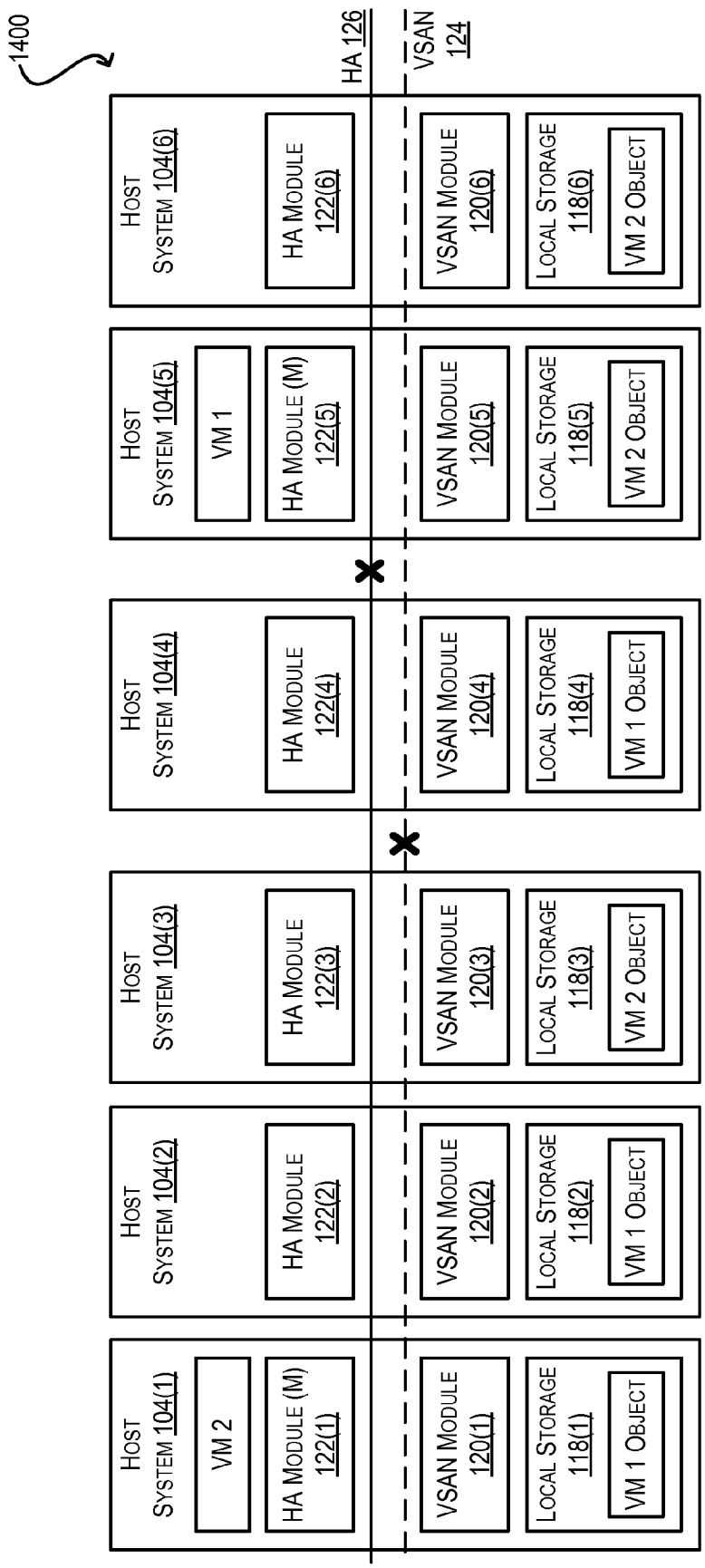
FIG. 14 depicts a partition scenario in which the VSAN and HA modules of a host cluster observe different network partitions according to an embodiment.

In this scenario, the HA and VSAN modules observe non-identical partitions. An example of this scenario is illustrated in FIG. 14, which depicts a host cluster 1400 of six host systems 104(1)-104(6) in which there is a first failure in management network 124 interconnecting VSAN modules 120(1)-120(6) that splits the cluster into two partitions [104(1), 104(2), 104(3)] and [104(4), 104(5), 104(6)], and there is a second failure in management network 126 interconnecting HA modules 122(1)-122(6) that splits the cluster into two different partitions [104(1), 104(2), 104(3), 104(4)] and [104(5), 104(6)].

If scenario 4 occurs, a master HA module that knows whether a given VM is protected may not know whether the VM is accessible within the master's partition. Conversely, a master HA module that knows whether a VM is accessible within its partition may not know whether the VM is protected. To process HA protection state updates and restart failed VMs quickly in this scenario, the master HA module that is responding to the protection request or knows a VM is protected should retry such operations repeatedly until they succeed.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system.

Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for persisting high availability (HA) protection state for virtual machines (VMs) running on host systems of a host cluster, wherein the host cluster aggregates locally-attached storage resources of the host systems to provide an object store, and wherein persistent data for the VMs is stored as per-VM storage objects across the locally-attached storage resources comprising the object store, the method comprising:
    determining, by a first host system in the host cluster executing a first HA module, an identity of a VM that has been powered-on in the host cluster; and
    persisting, by the first host system, HA protection state for the VM in a storage object of the VM, the HA protection state indicating that the VM should be restarted on an active host system in case of a failure in the host cluster.

2. The method of claim 1 wherein the storage object is a namespace object that includes a representation of a file system configured to store the VM's files.

3. The method of claim 1 wherein the HA protection state is persisted as metadata of the storage object.

4. The method of claim 3 wherein the persisting comprises:
    invoking a first storage application programming interface (API) exposed by a storage layer of the host cluster, the storage layer being configured to manage the object store.

5. The method of claim 4 wherein the metadata of the storage object is cached, by the storage layer, in an in-memory database that is available to each host system.

6. The method of claim 5 further comprising:
    invoking, by a second host system in the host cluster executing a second HA module, a second storage API exposed by the storage layer, the second storage API being configured to retrieve HA protection states for all accessible VMs in the host cluster; and
    receiving, by the second host system in response to the invoking of the second storage API, the HA protection states from the storage layer, wherein the storage layer processes the second storage API by consulting the in-memory database.

7. The method of claim 6 wherein the first and second HA modules are master HA modules, and wherein the second HA module is elected in response to a failure that causes the first host system to become inoperable or unreachable by the second host system.

8. A non-transitory computer readable storage medium having stored thereon computer software executable by a processor of a host system, the computer software embodying a method for persisting high availability (HA) protection state for virtual machines (VMs) running on the host system and other host systems of a host cluster, wherein the host cluster aggregates locally-attached storage resources of the host systems to provide an object store, and wherein persistent data for the VMs is stored as per-VM storage objects across the locally-attached storage resources comprising the object store, the method comprising:
    determining, via a HA module executing on the host system, an identity of a VM that has been powered-on in the host cluster; and
    persisting, HA protection state for the VM in a storage object of the VM, the HA protection state indicating that the VM should be restarted on an active host system in case of a failure in the host cluster.

9. The non-transitory computer readable storage medium of claim 8 wherein the storage object is a namespace object that includes a representation of a file system configured to store the VM's files.

10. The non-transitory computer readable storage medium of claim 8 wherein the HA protection state is persisted as metadata of the storage object.

11. The non-transitory computer readable storage medium of claim 10 wherein the persisting comprises:
    invoking a first storage application programming interface (API) exposed by a storage layer of the host cluster, the storage layer being configured to manage the object store.

12. The non-transitory computer readable storage medium of claim 11 wherein the metadata of the storage object is cached, by the storage layer, in an in-memory database that is available to each host system.

13. The non-transitory computer readable storage medium of claim 12 wherein another host system executing another HA module is configured to invoke a second storage API exposed by the storage layer, the second storage API being configured to retrieve HA protection states for all accessible VMs in the host cluster, and wherein said another host system is configured to receive, in response to the invoking of the second storage API, the HA protection states from the storage layer, the storage layer processing the second storage API by consulting the in-memory database.

14. The non-transitory computer readable storage medium of claim 13 wherein said HA module and said another HA module are master HA modules, and wherein said another master HA module is elected in response to a failure that causes the host system to become inoperable or unreachable by said another host system.

15. A host system comprising:
a processor; and
a non-transitory computer readable medium having stored thereon instructions that, when executed by the processor, causes the processor to perform a method for persisting high availability (HA) protection state for virtual machines (VMs) running on the host system and other host systems of a host cluster, wherein the host cluster aggregates locally-attached storage resources of the host systems to provide an object store, and wherein persistent data for the VMs is stored as per-VM storage objects across the locally-attached storage resources comprising the object store, the method comprising:
determining, via a HA module of the host system, an identity of a VM that has been powered-on in the host cluster; and
persisting, HA protection state for the VM in a storage object of the VM, the HA protection state indicating that the VM should be restarted on an active host system in case of a failure in the host cluster.

16. The host system of claim 15 wherein the storage object is a namespace object that includes a representation of a file system configured to store the VM's files.

17. The host system of claim 15 wherein the HA protection state is persisted as metadata of the storage object.

18. The host system of claim 17 wherein the persisting comprises:
invoking a first storage application programming interface (API) exposed by a storage layer of the host cluster, the storage layer being configured to manage the object store.

19. The host system of claim 18 wherein the metadata of the storage object is cached, by the storage layer, in an in-memory database that is available to each host system.

20. The host system of claim 19 wherein another host system executing another HA module is configured to invoke a second storage API exposed by the storage layer, the second storage API being configured to retrieve HA protection states for all accessible VMs in the host cluster, and wherein said another host system is configured to receive, in response to the invoking of the second storage API, the HA protection states from the storage layer, the storage layer processing the second storage API by consulting the in-memory database.

21. The host system of claim 20 wherein said HA module and said another HA module are master HA modules, and wherein said another master HA module is elected in response to a failure that causes the host system to become inoperable or unreachable by said another host system.

* * * * *